United States Patent
Choi et al.

(10) Patent No.: US 9,837,861 B2
(45) Date of Patent: Dec. 5, 2017

(54) RESONANCE POWER TRANSMISSION SYSTEM BASED ON POWER TRANSMISSION EFFICIENCY

(75) Inventors: Jin Sung Choi, Gimpo-si (KR); Sang Wook Kwon, Seongnam-si (KR); Yun Kwon Park, Dongducheon-si (KR); Eun Seok Park, Suwon-si (KR); Young Tack Hong, Seongnam-si (KR); Young Ho Ryu, Yongin-si (KR); Nam Yun Kim, Seoul (KR); Dong Zo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 827 days.

(21) Appl. No.: 13/211,687

(22) Filed: Aug. 17, 2011

(65) Prior Publication Data

US 2012/0049644 A1    Mar. 1, 2012

(30) Foreign Application Priority Data

Aug. 26, 2010   (KR) .......................... 10-2010-0082842

(51) Int. Cl.
 *H02J 50/10*    (2016.01)
 *H02J 7/02*     (2016.01)
 *H02J 50/40*    (2016.01)
 *H02J 50/12*    (2016.01)

(52) U.S. Cl.
 CPC .............. *H02J 50/10* (2016.02); *H02J 7/025* (2013.01); *H02J 50/40* (2016.02)

(58) Field of Classification Search
 CPC ................................. H02J 5/005; H02J 7/025
 USPC .................................................... 307/104, 9.1
 See application file for complete search history.

(56) References Cited

U.S. PATENT DOCUMENTS

| | | | |
|---|---|---|---|
| 5,013,898 A | 5/1991 | Glasspool | |
| 6,427,065 B1 * | 7/2002 | Suga ................... | G06K 7/0008 235/492 |
| 7,454,170 B2 | 11/2008 | Goossens et al. | |
| 2005/0007067 A1 | 1/2005 | Baarman et al. | |

(Continued)

FOREIGN PATENT DOCUMENTS

| | | |
|---|---|---|
| CN | 101645619 A | 2/2010 |
| CN | 101667754 A | 3/2010 |

(Continued)

OTHER PUBLICATIONS

Korean Office Action issued Aug. 28, 2013 in counterpart Korean Patent Application No. 10-2010-0082842 (5 pages in Korean).

(Continued)

*Primary Examiner* — Jared Fureman
*Assistant Examiner* — James Evans
(74) *Attorney, Agent, or Firm* — NSIP Law

(57) ABSTRACT

A resonance power transmission system for controlling a supply voltage of a power converter based on power transmission efficiency is provided. According to an aspect, a resonance power transmitter configured to transmit resonance power to one or more resonance power receivers may include: a voltage controller configured to receive an input signal and to output voltage of a predetermined level; a source controller configured to control a signal level of the DC voltage based the number of resonance power receivers.

14 Claims, 17 Drawing Sheets

(56) References Cited

U.S. PATENT DOCUMENTS

| | | | |
|---|---|---|---|
| 2005/0013447 A1* | 1/2005 | Crump | H02M 3/156 |
| | | | 381/71.6 |
| 2008/0067874 A1* | 3/2008 | Tseng | A61C 17/224 |
| | | | 307/104 |
| 2008/0315826 A1 | 12/2008 | Alberth, Jr. et al. | |
| 2009/0096413 A1 | 4/2009 | Partovi et al. | |
| 2009/0243397 A1* | 10/2009 | Cook et al. | 307/104 |
| 2009/0289595 A1 | 11/2009 | Chen et al. | |
| 2009/0312046 A1* | 12/2009 | Clevenger et al. | 455/522 |
| 2010/0052431 A1* | 3/2010 | Mita | 307/104 |
| 2010/0109443 A1* | 5/2010 | Cook et al. | 307/104 |
| 2010/0156346 A1* | 6/2010 | Takada et al. | 320/108 |
| 2010/0181961 A1 | 7/2010 | Novak et al. | |
| 2011/0080051 A1* | 4/2011 | Lee et al. | 307/104 |
| 2011/0081857 A1* | 4/2011 | Lee | G06K 7/0008 |
| | | | 455/41.1 |
| 2011/0095618 A1* | 4/2011 | Schatz et al. | 307/104 |
| 2011/0244913 A1* | 10/2011 | Kim | H04B 5/0037 |
| | | | 455/522 |

FOREIGN PATENT DOCUMENTS

| | | |
|---|---|---|
| JP | 2007-089341 | 4/2007 |
| JP | 2008-17592 A | 1/2008 |
| JP | 2010-178473 A | 8/2010 |
| KR | 10-2004-0098819 A | 11/2004 |
| KR | 10-2005-0105200 | 11/2005 |
| KR | 10-2009-0056546 | 6/2009 |
| KR | 10-2010-0017073 A | 2/2010 |

OTHER PUBLICATIONS

Chinese Office Action issued by the State Intellectual Property Office of P.R. China dated Dec. 25, 2014 in the corresponding CN Patent Application No. 201180041363.4 (8 page in Chinese with 10 page English Translation).
Japanese Office Action dated May 12, 2015 in counterpart Japanese Application No. 2013-525822 (4 pages in Japanese, 6 pages in English).
Chinese Office Action dated Mar. 9, 2016 in counterpart Chinese Application No. 201180041363.4 (20 pages in Chinese with English translation).
European Search report dated Apr. 6, 2017 in corresponding European Patent Application No. 11820158.1.

* cited by examiner

RESONANCE POWER TRANSMISSION SYSTEM BASED ON POWER TRANSMISSION EFFICIENCY

CROSS-REFERENCE TO RELATED APPLICATION(S)

This application claims the benefit under 35 U.S.C. §119 (a) of Korean Patent Application No. 10-2010-0082842, filed on Aug. 26, 2010, in the Korean Intellectual Property Office, the entire disclosure of which is incorporated herein by reference for all purposes.

BACKGROUND

1. Field

The following description relates to wireless power transmission.

2. Description of Related Art

Conventional resonance power transmission systems may include a source device and a target device. The source device may transmit a resonance power, and the target device may receive the resonance power. The resonance power may be wirelessly transferred from the source device to the target device.

Due to characteristics of a wireless environment, power transmission efficiency may be reduced when a number of devices to be charged are increased.

SUMMARY

According to an aspect, a resonance power transmitter may include: a voltage controller configured to receive an input of an alternating current (AC) signal of a first frequency band, and to output a direct current (DC) voltage of a predetermined level; a power converter configured to convert the DC voltage to AC power, by a switching pulse signal of a second frequency band; a source resonator configured to transfer the AC power to one or more resonance power receivers; and a source controller configured to control a signal level of the DC voltage based on a reflected power and the number of resonance power receivers.

The source controller may be configured to discretely control the signal level of the DC voltage based on the number of the resonance power receivers.

The source controller may be configured to control the signal level of the DC voltage based on a distance between the source resonator and the one or more resonance power receivers.

The source controller may be configured to control the signal level of the DC voltage based on a charge state of a load connected to the one or more resonance power receivers.

When an amount of the reflected power is increased, the source controller may be configured to reduce the signal level of the DC voltage, and when the amount of the reflected power is reduced, the source controller may be configured to increase the signal level of the DC voltage.

The resonance power transmitter may further include: a communication unit configured to receive an identifier (ID) from the one or more resonance power receivers, wherein the source controller is configured to recognize the number of the resonance power receivers, based on the IDs received.

The second frequency band may range from 2 to 20 MHz.

When the number of the resonance power receivers remains unchanged, and when an amount of the reflected power is changed, the source controller may be configured to change the signal level of the DC voltage.

According to another aspect, a method of controlling power conversion in a resonance power transmitter may include: recognizing a number of resonance power receivers; measuring a reflected power corresponding to a resonance power; and controlling voltage supplied to a power converter based on the measured reflected power and the number of the resonance power receivers.

The voltage may be discretely controlled based on the number of the resonance power receivers.

The controlling may include: reducing the voltage when an amount of the reflected power is increased, and increasing the voltage when the amount of the reflected power is reduced.

The controlling may include: linearly controlling the voltage, when the number of the resonance power receivers remains unchanged, and when an amount of the reflected power is changed.

The voltage supplied to the power converter may be direct current (DC) voltage.

Recognizing the number of resonance power receivers may include receiving an identifier (ID) from one or more resonance power receivers.

Resonance power may be transmitted to one or more resonance power receivers.

According to yet another aspect, a resonance power transmitter configured to transmit resonance power to one or more resonance power receivers may include: a voltage controller configured to receive an input signal and to output voltage of a predetermined level; a source controller configured to control a signal level of the DC voltage based the number of resonance power receivers.

The source controller may be configured to control the signal level of the DC voltage based on reflected power and the number of resonance power receivers.

The number of resonance power receivers may be determined by receiving an identifier (ID) from the one or more resonance power receivers.

According to a further aspect, a method of controlling power conversion in a resonance power transmitter configured to transmit resonance power to one or more resonance power receiver may include: recognizing the number of resonance power receivers; and controlling voltage supplied to a power converter based the number of the resonance power receivers.

Controlling voltage supplied to a power converter may be based on reflected power and the number of the resonance power receivers.

Other features and aspects will be apparent from the following detailed description, the drawings, and the claims.

Figure 1:
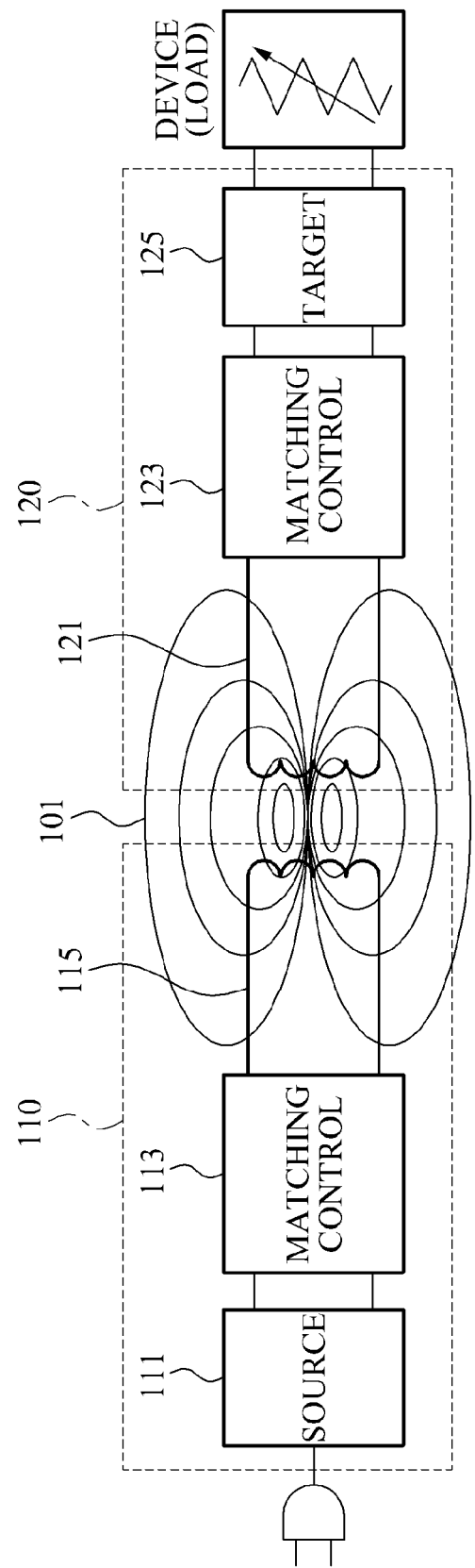
FIG. 1 is a diagram illustrating a wireless power transmission system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of operations is not limited to that set forth herein and may be changed as is known in the art, with the exception of operations necessarily occurring in a certain order. Also, description of well-known functions and constructions may be omitted for increased clarity and conciseness.

FIG. 1 illustrates a wireless power transmission system. In one or more embodiments, the wireless power transmitted may be resonance power.

As shown in FIG. 1, the wireless power transmission system may have a source-target structure including a source and a target. For example, the wireless power transmission system may include a resonance power transmitter 110 corresponding to the source and a resonance power receiver 120 corresponding to the target.

The resonance power transmitter 110 may include, for example, a source unit 111 and a source resonator 115. The source unit 111 may be configured to receive energy from an external voltage supplier to generate a resonance power. In some instances, the resonance power transmitter 110 may further include a matching control 113 to perform functions such as, for example, resonance frequency and/or impedance matching.

The source unit 111 may include an alternating current (AC)-to-AC (AC/AC) converter, an AC-to-direct current (DC) (AC/DC) converter, and/or a DC-to-AC (DC/AC) inverter. The AC/AC converter may be configured to adjust, to a desired level, a signal level of an AC signal input from an external device. The AC/DC converter may output a DC voltage at a predetermined level by rectifying an AC signal output from the AC/AC converter. The DC/AC inverter may be configured to generate an AC signal (e.g., in a band of a few megahertz (MHz) to tens of MHz) by quickly switching a DC voltage output from the AC/DC converter. Other frequencies of AC power are also possible. The matching control 113 may be configured to set a resonance bandwidth of the source resonator 115 and/or an impedance matching frequency of the source resonator 115. In some implementations, the matching control 113 may include a source resonance bandwidth setting unit and/or a source matching frequency setting unit. And the source resonance bandwidth setting unit may set the resonance bandwidth of the source resonator 115. The source matching frequency setting unit may set the impedance matching frequency of the source resonator 115. For example, a Q-factor of the source resonator 115 may be determined based on a setting of the resonance bandwidth of the source resonator 115 or a setting of the impedance matching frequency of the source resonator 115.

The source resonator 115 may be configured to transfer electromagnetic energy to a target resonator 121. For example, the source resonator 115 may transfer the resonance power to the resonance power receiver 120 through magnetic coupling 101 with the target resonator 121. Accordingly, the source resonator 115 may be configured to resonate within the set resonance bandwidth.

As shown, the resonance power receiver 120 may include, for example, the target resonator 121, a matching control 123 to perform resonance frequency and/or impedance matching, and a target unit 125 to transfer the received resonance power to a device or a load.

The target resonator 121 may be configured to receive the electromagnetic energy from the source resonator 115. The target resonator 121 may be configured to resonate within the set resonance bandwidth.

The matching control 123 may set a resonance bandwidth of the target resonator 121 and/or an impedance matching frequency of the target resonator 121. In some instances, the matching control 123 may include a target resonance bandwidth setting unit and/or a target matching frequency setting unit. The target resonance bandwidth setting unit may be configured to set the resonance bandwidth of the target resonator 121. The target matching frequency setting unit may set the impedance matching frequency of the target resonator 121. For example, a Q-factor of the target resonator 121 may be determined based on a setting of the resonance bandwidth of the target resonator 121 or a setting of the impedance matching frequency of the target resonator 121.

The target unit 125 may be configured to transfer the received resonance power to the load. The target unit 125 may include, for example, an AC/DC converter and a DC/DC converter. The AC/DC converter may generate a DC voltage by rectifying an AC signal transmitted from the source resonator 115 to the target resonator 121. And the DC/DC converter may supply a rated voltage to a device or the load by adjusting the voltage level of the DC voltage.

In one or more embodiments, the source resonator 115 and the target resonator 121 may be configured, for example, as a helix coil structured resonator, a spiral coil structured resonator, a meta-structured resonator, and the like.

Referring to FIG. 1, controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set to be wider or narrower than the resonance bandwidth of the target resonator 121 in some instances. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

For a wireless power transmission employing a resonance scheme, the resonance bandwidth may be an important factor. When the Q-factor, (e.g., considering a change in a distance between the source resonator 115 and the target resonator 121, a change in the resonance impedance, impedance mismatching, a reflected signal, and/or the like), is represented by Qt, Qt may have an inverse-proportional relationship with the resonance bandwidth, as given by Equation 1.

$$\frac{\Delta f}{f_0} = \frac{1}{Qt}$$ [Equation 1]
$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. The BW-factor may indicate either $1/BW_S$ or $1/BW_D$.

Due to an external effect, for example, a change in the distance between the source resonator 115 and the target resonator 121, a change in a location of the source resonator 115 and/or the target resonator 121, and/or the like, impedance mismatching between the source resonator 115 and the target resonator 121 may occur. The impedance mismatching may be a direct cause in decreasing an efficiency of power transfer. When a reflected wave corresponding to a transmission signal that is partially reflected and returned is detected, the matching control 113 may be configured to determine that impedance mismatching has occurred, and may perform impedance matching. For example, the matching control 113 may change a resonance frequency by detecting a resonance point through a waveform analysis of the reflected wave. The matching control 113 may determine, as the resonance frequency, a frequency having a minimum amplitude in the waveform of the reflected wave.

Figure 9:
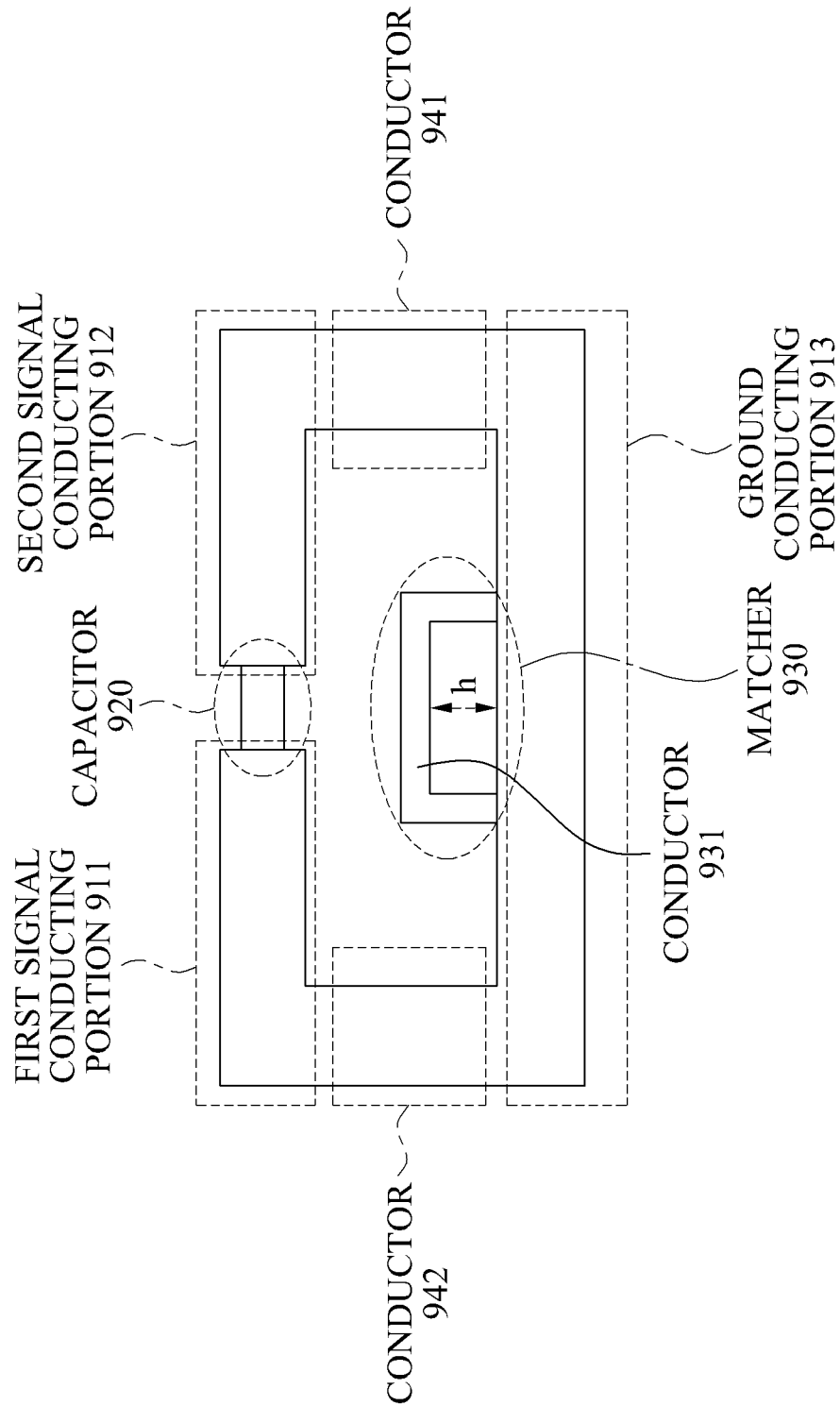
FIG. 9 illustrates a resonator structure having a two-dimensional (2D) structure.
Figure 10:
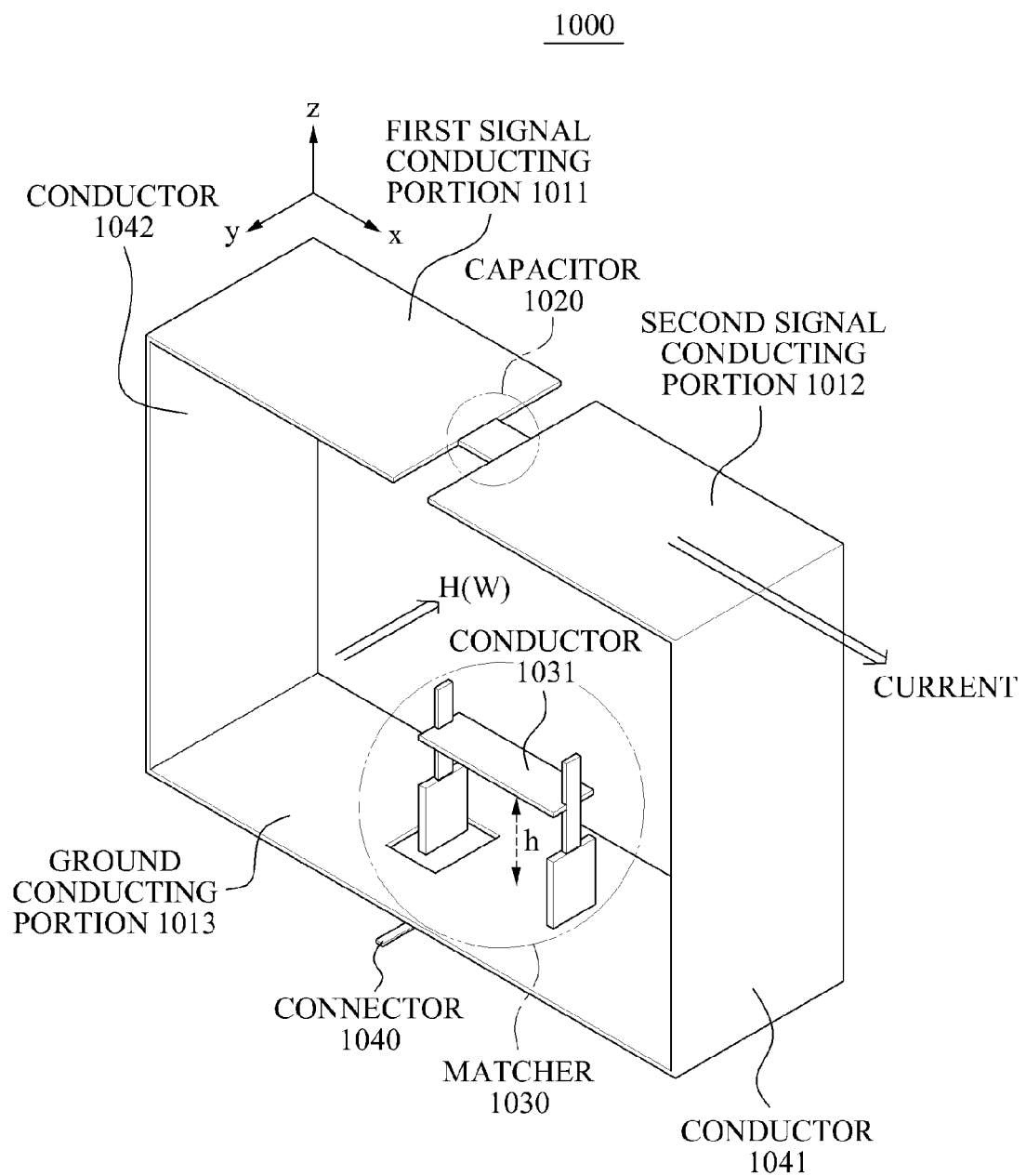
FIG. 10 illustrates a resonator structure having a three-dimensional (3D) structure.
Figure 11:
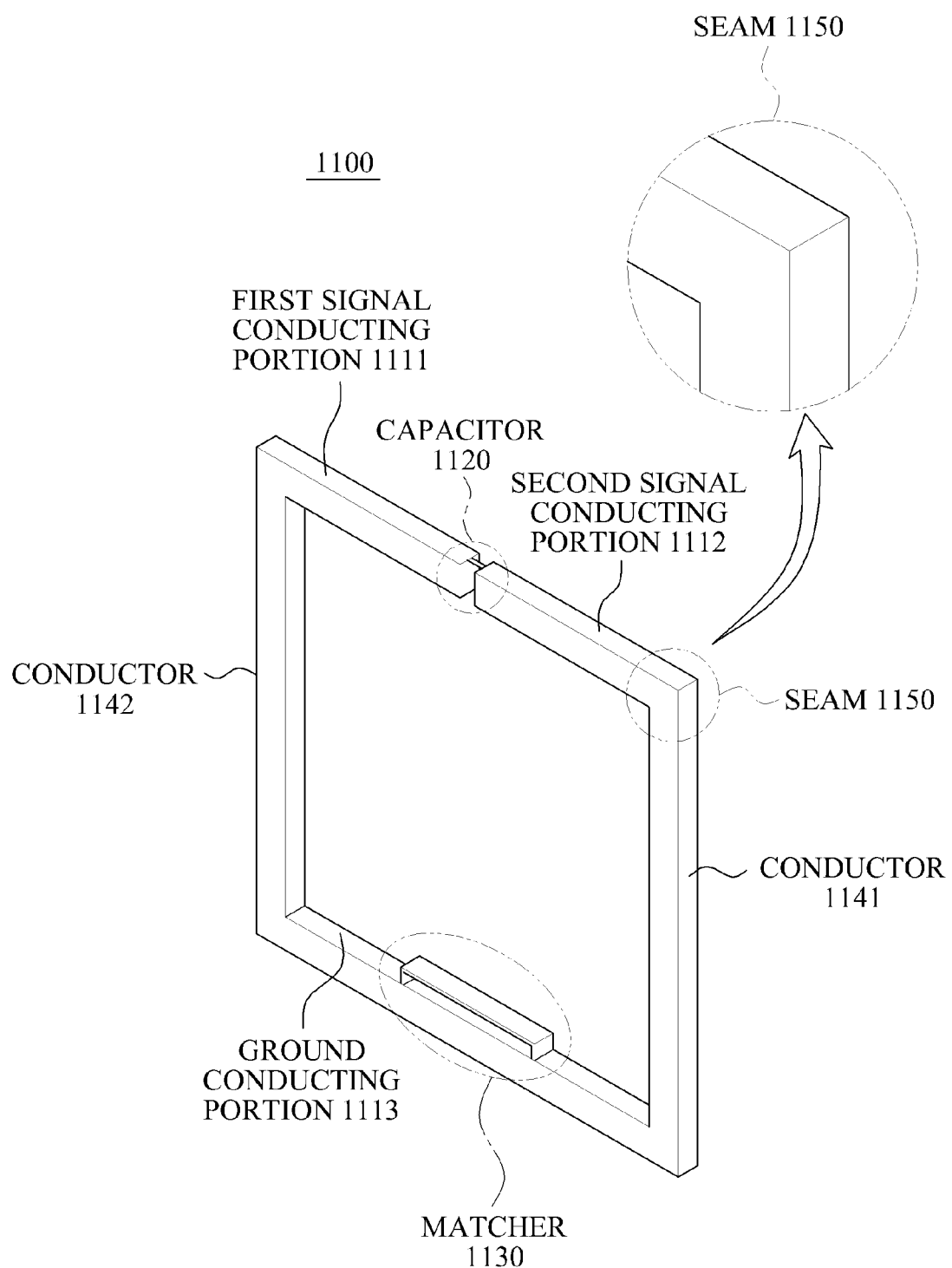
FIG. 11 illustrates a resonator for a wireless power transmission configured as a bulky type.

The source resonator 115 and the target resonator 121 of FIG. 1 may be configured, for example, as illustrated in FIGS. 9 through 11.

Figure 2:
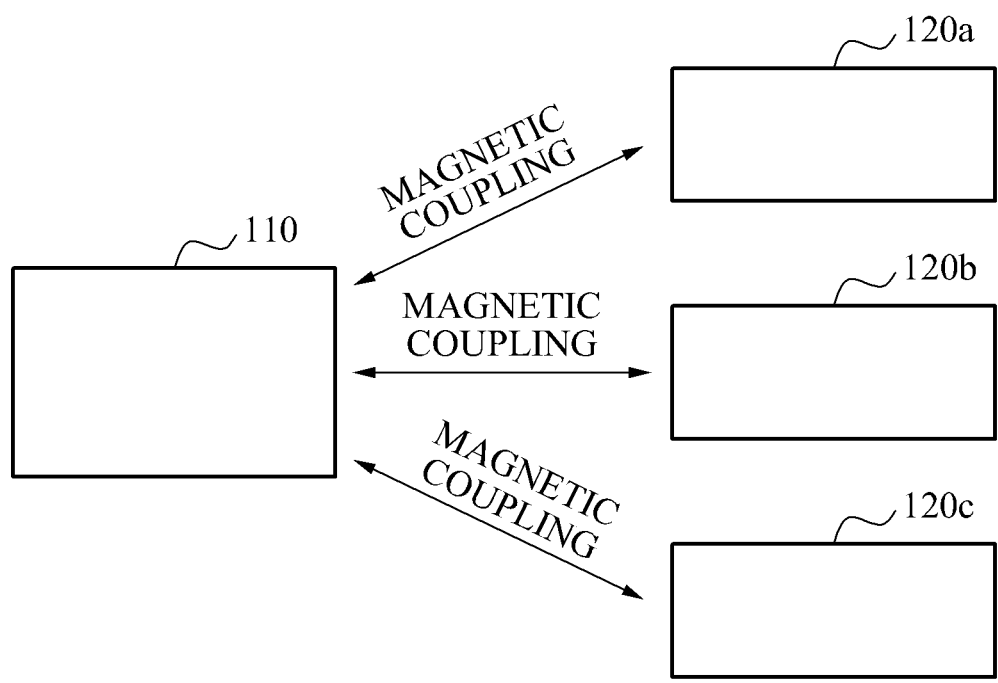
FIG. 2 is a diagram illustrating charging a plurality of electronic devices.

FIG. 2 illustrates charging a plurality of electronic devices.

As shown, the resonance power transmitter 110 may transmit a resonance power to one or more resonance power receivers 120a, 120b, and 120c, via magnetic coupling, for instance.

Figure 7:
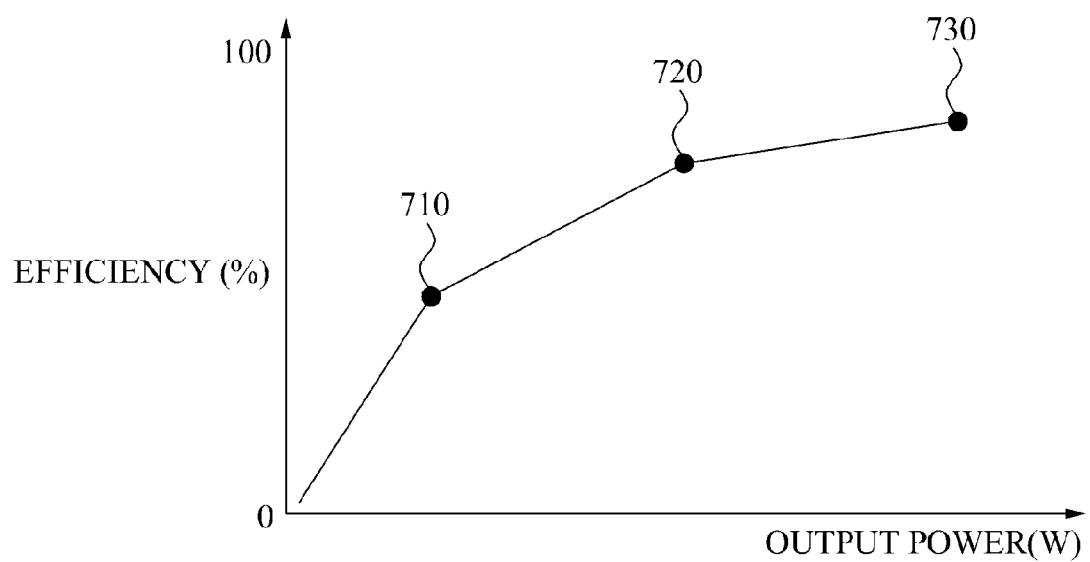
FIG. 7 is a diagram illustrating a relationship between output power of a resonance power transmitter and power transmission efficiency.

Power supplied to the resonance power transmitter 110 may be controlled based on the number of resonance power receivers. However, when the power supplied to the resonance power transmitter 110 is controlled, power transmission efficiency may vary depending on the number of resonance power receivers, as illustrated in FIG. 7.

Thus, to maintain substantially constant power transmission efficiency, the voltage supplied to a power converter included in the resonance power transmitter 110 may be controlled based on the number of resonance power receivers.

Figure 3:
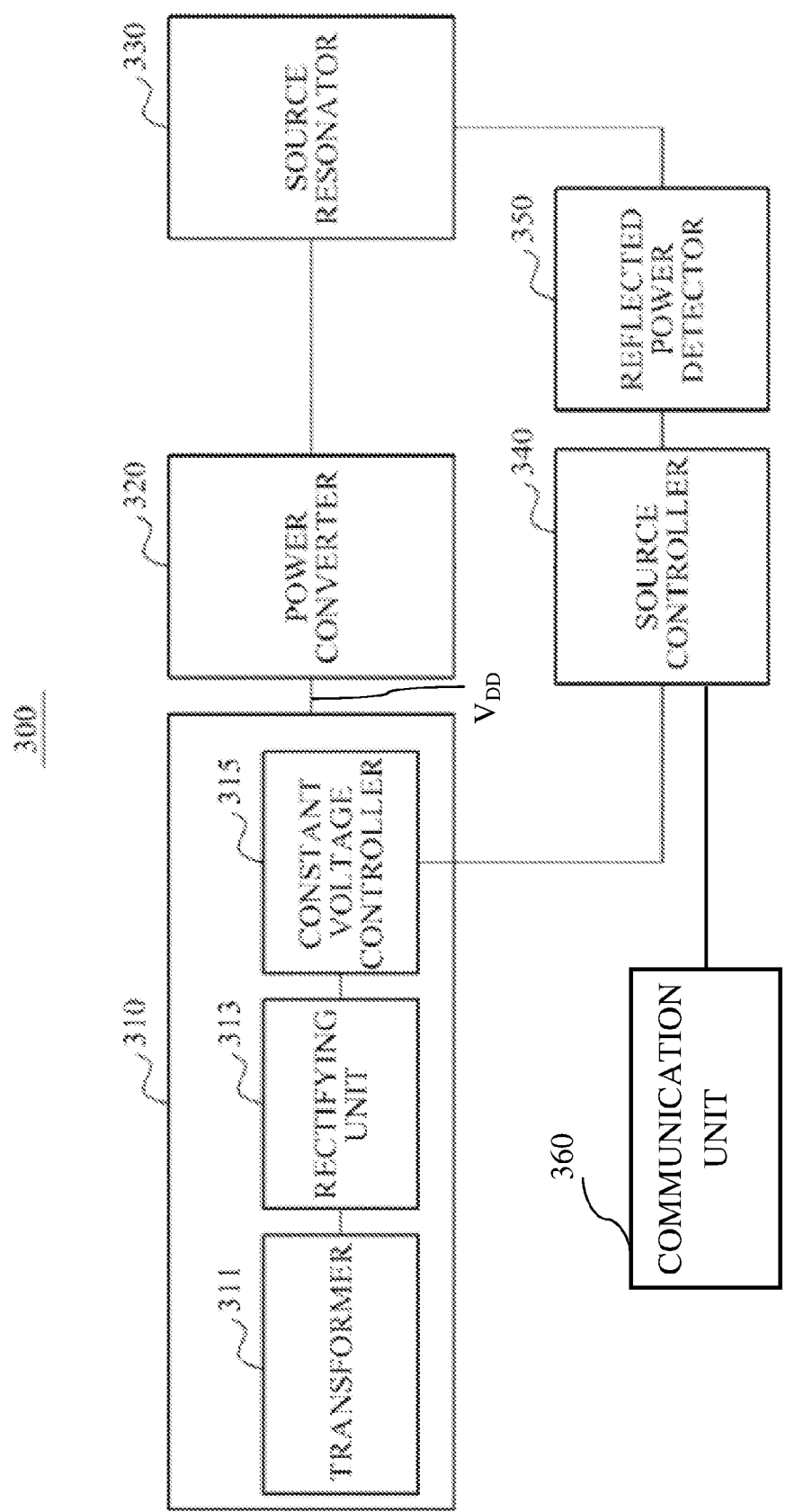
FIG. 3 is a block diagram illustrating a resonance power transmitter.

FIG. 3 illustrates a resonance power transmitter 300.

The resonance power transmitter 300 may include a voltage controller 310, a power converter 320, a source resonator 330, and a source controller 340. In some embodiments, the resonance power transmitter 300 may further include a reflected power detector 350, and a communication unit.

The voltage controller 310 may receive an input of an AC signal of a first frequency band, and may output a DC voltage of a predetermined level. The first frequency band may be, for example, a band of several tens of Hz. Additionally, the AC signal of the first frequency band may be generated by a high-speed switching scheme employing a high-speed switching device, or by an oscillation scheme employing an oscillator. The voltage controller 310 may include a transformer 311, a rectifying unit 313, and a constant voltage controller 315.

The transformer 311 may adjust, to a desired level, a signal level of an AC signal received from an external device.

The rectifying unit 313 may output a DC signal by rectifying the AC signal output from the transformer 311.

The constant voltage controller 315 may output a DC voltage of a predetermined level, under a control of the source controller 340. The constant voltage controller 315 may include a stabilization circuit to output a DC voltage of a predetermined level. A voltage level of the DC voltage output from the constant voltage controller 315 may be determined by controlling an amount of power required by a target device and controlling an amount of a resonance power to be output.

The power converter 320 may convert the DC voltage of the predetermined level to an AC power by a switching pulse signal of a second frequency band. Accordingly, the power converter 320 may include an AC/DC inverter. The second frequency band may range from several MHz to several tens of MHz, for example, from 2 to 20 MHz. The AC/DC inverter may generate a resonance power by converting the DC signal output from the voltage controller 310 to an AC signal. In other words, the AC/DC inverter may convert the DC voltage output from the constant voltage controller 315 to an AC voltage, by the switching pulse signal of the second frequency band. The AC/DC inverter may include a switching device for high-speed switching. When the switching pulse signal is "high," (e.g., at or near its peak) the switching device may be powered "on." On the other hand, when the switching pulse signal is "low," (e.g., at or near its minimum) the switching device may be powered "off."

The source resonator 330 may transfer the AC power to a resonance power receiver, for example, via magnetic coupling.

The source controller 340 may control the signal level of the DC voltage output from the voltage controller 310, based on a reflected power and a number of resonance power receivers.

For instance, the source controller 340 may control the signal level of the DC voltage output from the voltage controller 310, based on the number of the resonance power receivers. In some embodiments, the signal level may be discretely controlled.

Figure 5:
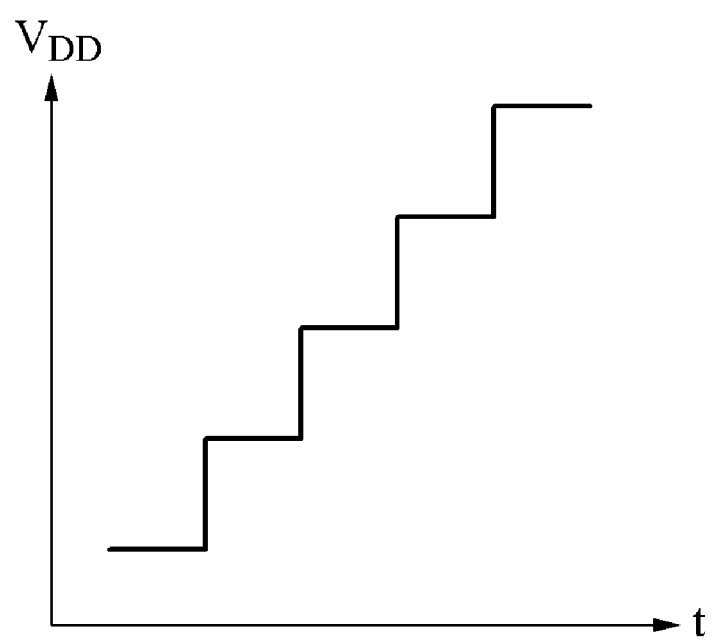
FIG. 5 is a side diagram illustrating discretely controlling a direct current (DC) voltage output from a voltage controller.

FIG. 5 illustrates discretely controlling a DC voltage $V_{DD}$ output from the voltage controller 310.

Additionally, the source controller 340 may control the signal level of the DC voltage output from the voltage controller 310, based on a distance between the source resonator 330 and a resonance power receiver. The signal level may be linearly controlled in some instances.

Figure 6:
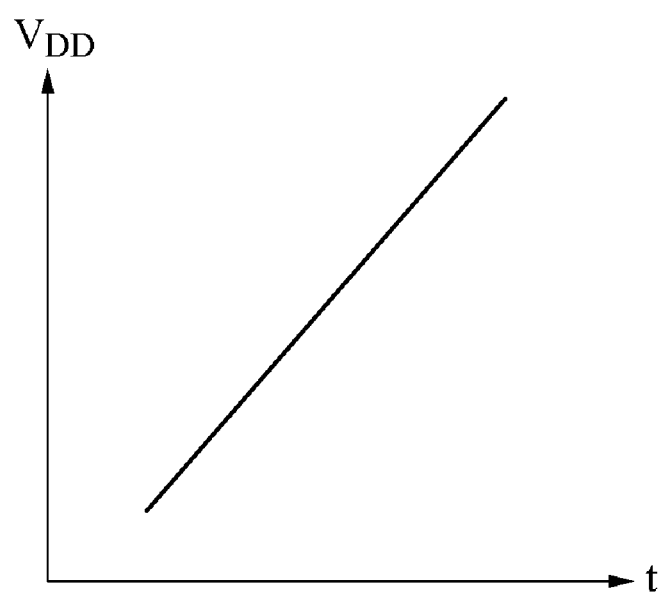
FIG. 6 is a side diagram illustrating linearly controlling a DC voltage output from the voltage controller.

FIG. 6 illustrates linearly controlling a DC voltage $V_{DD}$ output from the voltage controller 310. The distance between the source resonator 330 and the resonance power receiver may be changed based on an amount of the reflected power. When the resonance power receiver is far away from the resonance power transmitter 300, the amount of the reflected power may be increased. When an increase in the amount of the reflected power is detected, the source controller 340 may increase the signal level of the DC voltage output from the voltage controller 310. As used herein, "reflected power" refers to the power of a reflected signal.

Furthermore, the source controller 340 may control the signal level of the DC voltage output from the voltage controller 310, based on a charge state of a load connected to a resonance power receiver.

For example, when the amount of the reflected power is increased, the source controller 340 may reduce the signal level of the DC voltage output from the voltage controller 310. Conversely, when the amount of the reflected power is reduced, the source controller 340 may increase the signal level of the DC voltage output from the voltage controller 310.

The source controller 340 may recognize the number of the resonance power receivers. Recognition of the number of resonance power receivers may be based on a number of identifiers (IDs) received from the resonance power receivers. For example, when receiving a resonance power is started, a resonance power receiver may periodically transmit an ID of the resonance power receiver to the resonance power transmitter 300, and may notify the resonance power transmitter 300 that the resonance power is being received. The source controller 340 may determine whether the number of the resonance power receivers remains unchanged, based on whether the ID is received. On the other hand, when the number of the resonance power receivers remains unchanged but the amount of the reflected power changes, the source controller 340 may control the signal level of the DC voltage. The signal level may be linearly controlled.

The reflected power detector 350 may detect a reflected power corresponding to the resonance power transmitted to the resonance power receiver. The reflected power detector 350 may detect a reflected signal using a coupler, and may compute a power of the detected reflected signal. When the reflected power is detected, the source controller 340 may determine that the number of the resonance power receivers is reduced, or that a distance to the resonance power receiver is increased. Additionally, when an amount of the reflected power to be detected is equal to or greater than a predetermined value, the source controller 340 may determine that the charge state of the load connected to the resonance power receiver is changed. The source controller 340 may control the signal level of the DC voltage output from the voltage controller 310, based on the charge state of the load connected to the resonance power receiver. Thus, the source controller 340 may control the signal level of the DC voltage output from the voltage controller 310, based on whether the reflected power is detected.

The communication unit 360 may receive an ID of a resonance power receiver, and may transfer the received ID to the source controller 340.

According to an embodiment, to control power conversion of a resonance power transmitter, the number of the resonance power receivers may be recognized based on IDs of the resonance power receivers. Additionally, in some embodiments, reflected power corresponding to a resonance power transmitted to the resonance power receivers may be measured. And a signal level of a DC voltage supplied to a power converter may be controlled based on both the measured reflected power and the number of the resonance power receivers.

Figure 4:
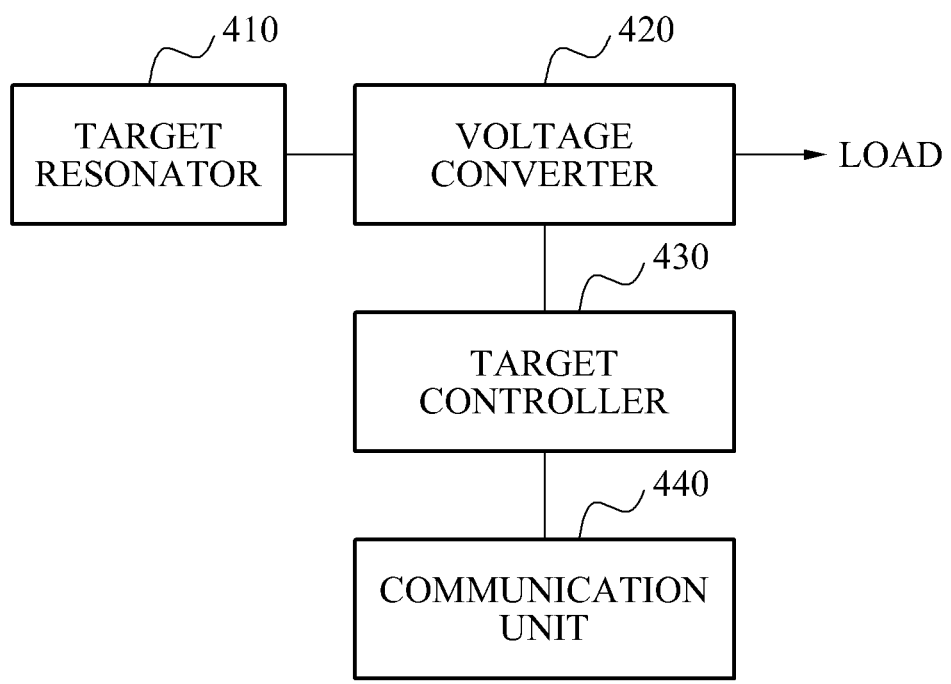
FIG. 4 is a block diagram illustrating a resonance power receiver.

FIG. 4 illustrates a resonance power receiver 400.

The resonance power receiver 400 may include a target resonator 410, a voltage converter 420, a target controller 430, and a communication unit 440.

The target resonator 410 may receive an AC power from a resonance power transmitter, via magnetic coupling, for instance. The target resonator 410 may include one or more resonators configured as illustrated in FIGS. 9 through 11.

The voltage converter 420 may acquire a DC voltage from the AC power, and may supply the acquired DC voltage to a load. The voltage converter 420 may include an AC/DC converter, and a DC-to-DC (DC/DC) converter. The AC/DC converter may convert an AC signal to a DC signal, and the DC/DC converter may adjust a signal level of a DC signal.

When receiving a resonance power is started, the target controller 430 may generate an ID of the resonance power receiver 400, and may transmit the generated ID to the resonance power transmitter via the communication unit 440. According to an aspect, the ID of the resonance power receiver 400 may be stored in a memory.

The communication unit 440 may transmit the ID of the resonance power receiver 400 to the resonance power transmitter. The communication unit 440 may perform an in-band communication for transmitting or receiving data to or from the resonance power transmitter via a resonance frequency, and may perform an out-band communication for transmitting or receiving data to or from a target device via a frequency assigned for data communication.

Figure 8:
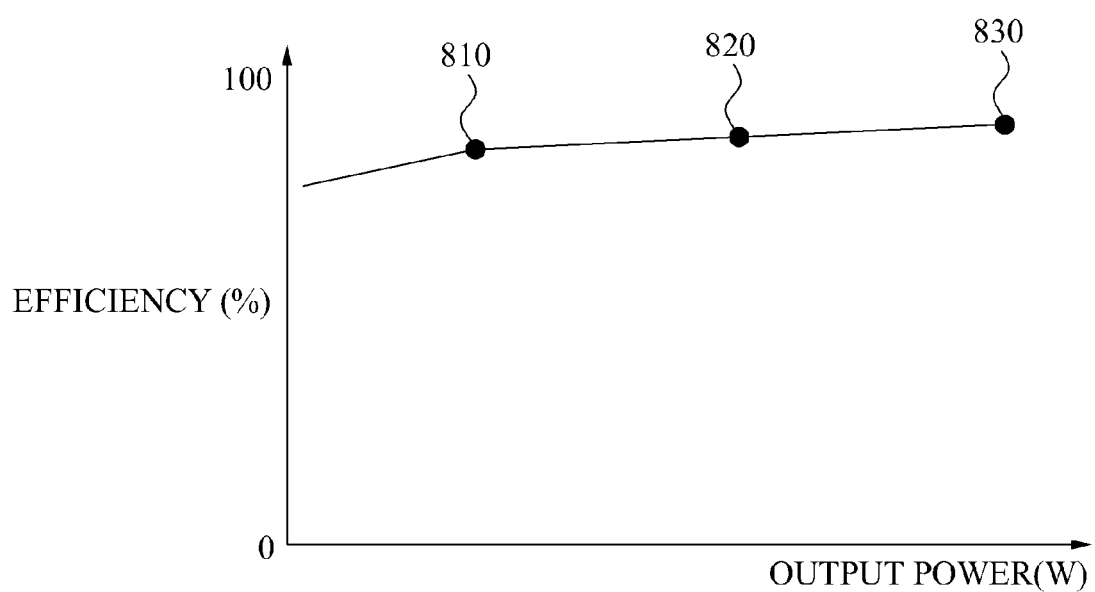
FIG. 8 is a diagram illustrating another relationship between output power of a resonance power transmitter and power transmission efficiency.

The term "in-band" communication(s), as used herein, means communication(s) in which information (such as, for example, control information, data and/or metadata) is transmitted in the same frequency band, and/or on the same channel, as used for power transmission. According to one or more embodiments, the frequency may be a resonance frequency. And, the term "out-band" communication(s), as used herein, means communication(s) in which information (such as, for example, control information, data and/or metadata) is transmitted in a separate frequency band and/or using a separate or dedicated channel, than used for power transmission. FIG. 7 illustrates a relationship between output power of a resonance power transmitter and power transmission efficiency. FIG. 8 illustrates another relationship between output power of a resonance power transmitter and power transmission efficiency.

FIG. 7 illustrates a situation in which the supply voltage of a power converter is fixed and the output power of the resonance power transmitter is increased. In FIG. 7, reference numeral 710 represents the relationship between the output power and the power transmission efficiency in a case in which a single device is to be charged, and reference numeral 720 represents the relationship between the output power and the power transmission efficiency when two devices are to be charged. Additionally, reference numeral 730 represents the relationship between the output power and the power transmission efficiency when three devices are to be charged. Accordingly, as illustrated in FIG. 7, the power transmission efficiency may vary depending on the output power of the resonance power transmitter. And as shown, the power transmission efficiency may be increased when additional devices are charged.

FIG. 8 illustrates when the supply voltage of a power converter is adjusted based on a number of devices to be charged. In FIG. 8, reference numeral 810 represents the relationship between the output power and the power transmission efficiency in a case in which a single device is to be charged, and reference numeral 820 represents the relationship between the output power and the power transmission efficiency in a case in which two devices are to be charged. Additionally, reference numeral 830 represents the relationship between the output power and the power transmission efficiency in a case in which three devices are to be charged. Accordingly, the power transmission efficiency may remain substantially unchanged, even though the output power of the resonance power transmitter is changed.

According to various example embodiments, it is possible to maintain an efficiency of a resonance power transmission system by controlling a supply voltage of a power converter based on a number of devices that receive a resonance power and are charged with voltage. Additionally, it may be possible to transmit a resonance power without additional power loss, by controlling a supply voltage of a power converter.

Referring again to FIG. 1, the source resonator 115 and/or a target resonator 121 of the wireless power transmission system may be configured as, for example, a helix coil structured resonator, a spiral coil structured resonator, a meta-structured resonator, and/or the like.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

The magnetic permeability may indicate a ratio between a magnetic flux density occurring with respect to a predetermined magnetic field in a corresponding material and a magnetic flux density occurring with respect to the predetermined magnetic field in a vacuum state. The magnetic permeability and the permittivity may determine a propagation constant of a corresponding material in a predetermined frequency or a predetermined wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area.

FIG. 9 is an illustration of a resonator 900 having a two-dimensional (2D) structure.

As shown, the resonator 900 may include a transmission line, a capacitor 920, a matcher 930, and conductors 941 and 942. The transmission line may include, for instance, a first signal conducting portion 911, a second signal conducting portion 912, and a ground conducting portion 913.

The capacitor 920 may be inserted or otherwise positioned in series between the first signal conducting portion 911 and the second signal conducting portion 912 so that an electric field may be confined within the capacitor 920. In various implementations, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. As illustrated in FIG. 9, the resonator 900 may be configured to have a generally 2D structure. The transmission line may include the first signal conducting portion 911 and the second signal conducting portion 912 in the upper portion of the transmission line, and may include the ground conducting portion 913 in the lower portion of the transmission line. As shown, the first signal conducting portion 911 and the second signal conducting portion 912 may be disposed to face the ground conducting portion 913 with current flowing through the first signal conducting portion 911 and the second signal conducting portion 912.

In some implementations, one end of the first signal conducting portion 911 may be electrically connected (i.e., shorted) to the conductor 942, and another end of the first signal conducting portion 911 may be connected to the capacitor 920. One end of the second signal conducting portion 912 may be grounded to the conductor 941, and another end of the second signal conducting portion 912 may be connected to the capacitor 920. Accordingly, the first signal conducting portion 911, the second signal conducting portion 912, the ground conducting portion 913, and the conductors 941 and 942 may be connected to each other such that the resonator 900 may have an electrically "closed-loop structure." The term "closed-loop structure" as used herein, may include a polygonal structure, for example, a circular structure, a rectangular structure, or the like that is electrically closed.

The capacitor 920 may be inserted into an intermediate portion of the transmission line. For example, the capacitor 920 may be inserted into a space between the first signal conducting portion 911 and the second signal conducting portion 912. The capacitor 920 may be configured, in some instances, as a lumped element, a distributed element, or the like. For example, a distributed capacitor may be configured as a distributed element and may include zigzagged conductor lines and a dielectric material having a relatively high permittivity between the zigzagged conductor lines.

When the capacitor 920 is inserted into the transmission line, the resonator 900 may have a property of a metamaterial, as discussed above. For example, the resonator 900 may have a negative magnetic permeability due to the capacitance of the capacitor 920. If so, the resonator 900 may also be referred to as a mu negative (MNG) resonator. Various criteria may be applied to determine the capacitance of the capacitor 920. For example, the various criteria for enabling the resonator 900 to have the characteristic of the metamaterial may include one or more of the following: a criterion to enable the resonator 900 to have a negative magnetic permeability in a target frequency, a criterion to enable the resonator 900 to have a zeroth order resonance characteristic in the target frequency, or the like. The resonator 900, also referred to as the MNG resonator 900, may also have a zeroth order resonance characteristic (i.e., having, as a resonance frequency, a frequency when a propagation constant is "0"). If the resonator 900 has the zeroth order resonance characteristic, the resonance frequency may be independent with respect to a physical size of the MNG resonator 900. Moreover, by appropriately designing (or configuring) the capacitor 920, the MNG resonator 900 may sufficiently change the resonance frequency without substantially changing the physical size of the MNG resonator 900.

In a near field, for instance, the electric field may be concentrated on the capacitor 920 inserted into the transmission line. Accordingly, due to the capacitor 920, the magnetic field may become dominant in the near field. In one or more embodiments, the MNG resonator 900 may have a relatively high Q-factor using the capacitor 920 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 900 may include a matcher 930 to be used in impedance matching. For example, the matcher 930 may be configured to appropriately determine and adjust the strength of a magnetic field of the MNG resonator 900. Depending on the configuration, current may flow in the MNG resonator 900 via a connector, or may flow out from the MNG resonator 900 via the connector. The connector may be connected to the ground conducting portion 913 or the matcher 930. In some instances, the power may be transferred through coupling without using a physical connection between the connector and the ground conducting portion 913 or the matcher 930.

As illustrated in FIG. 9, the matcher 930 may be positioned within the loop formed by the loop structure of the resonator 900. The matcher 930 may adjust the impedance of the resonator 900 by changing the physical shape of the matcher 930. For example, the matcher 930 may include the conductor 931 to be used in the impedance matching positioned in a location that is separate from the ground conducting portion 913 by a distance h. The impedance of the resonator 900 may be changed by adjusting the distance h.

In some instances, a controller may be provided to control the matcher 930 which generates and transmits a control signal to the matcher 930 directing the matcher to change its physical shape so that the impedance of the resonator may be adjusted. For example, the distance h between the conductor 931 of the matcher 930 and the ground conducting portion 913 may be increased or decreased based on the control signal. The controller may generate the control signal based on various factors.

As illustrated in FIG. 9, the matcher 930 may be configured as a passive element such as the conductor 931, for example. Of course in other embodiments, the matcher 930 may be configured as an active element such as a diode, a transistor, or the like. If the active element is included in the matcher 930, the active element may be driven based on the control signal generated by the controller, and the impedance of the resonator 900 may be adjusted based on the control signal. For example, when the active element is a diode included in the matcher 930 the impedance of the resonator 900 may be adjusted depending on whether the diode is in an ON state or in an OFF state.

In some instances, a magnetic core may be further provided to pass through the MNG resonator 900. The magnetic core may perform a function of increasing a power transmission distance.

FIG. 10 is illustration of a resonator 1000 having a three-dimensional (3D) structure.

Referring to FIG. 10, the resonator 1000 may include a transmission line and a capacitor 1020. The transmission line may include a first signal conducting portion 1011, a second signal conducting portion 1012, and a ground conducting portion 1013. The capacitor 1020 may be inserted, for instance, in series between the first signal conducting portion 1011 and the second signal conducting portion 1012 of the transmission link such that an electric field may be confined within the capacitor 1020.

As illustrated in FIG. 10, the resonator 1000 may have a generally 3D structure. The transmission line may include the first signal conducting portion 1011 and the second signal conducting portion 1012 in an upper portion of the resonator 1000, and may include the ground conducting portion 1013 in a lower portion of the resonator 1000. The first signal conducting portion 1011 and the second signal conducting portion 1012 may be disposed to face the ground conducting portion 1013. In this arrangement, current may flow in an x direction through the first signal conducting portion 1011 and the second signal conducting portion 1012. Due to the current, a magnetic field H(W) may be formed in a −y direction. However, it will be appreciated that the magnetic field H(W) might also be formed in the opposite direction (e.g., a +y direction) in other implementations.

In one or more embodiments, one end of the first signal conducting portion 1011 may be electrically connected (i.e., shorted) to the conductor 1042, and another end of the first signal conducting portion 1011 may be connected to the capacitor 1020. One end of the second signal conducting portion 1012 may be grounded to the conductor 1041, and another end of the second signal conducting portion 1012 may be connected to the capacitor 1020. Accordingly, the first signal conducting portion 1011, the second signal conducting portion 1012, the ground conducting portion 1013, and the conductors 1041 and 1042 may be connected to each other, whereby the resonator 1000 may have an electrically closed-loop structure. As illustrated in FIG. 10, the capacitor 1020 may be inserted or otherwise positioned between the first signal conducting portion 1011 and the second signal conducting portion 1012. For example, the capacitor 1020 may be inserted into a space between the first signal conducting portion 1011 and the second signal conducting portion 1012. The capacitor 1020 may include, for example, a lumped element, a distributed element, and the like. In one implementation, a distributed capacitor having the shape of the distributed element may include zigzagged conductor lines and a dielectric material having a relatively high permittivity positioned between the zigzagged conductor lines.

When the capacitor 1020 is inserted into the transmission line, the resonator 1000 may have a property of a metamaterial, in some instances, as discussed above.

For example, when the capacitance of the capacitor inserted as the lumped element is appropriately determined, the resonator 1000 may have the characteristic of the metamaterial. When the resonator 1000 has a negative magnetic permeability by appropriately adjusting the capacitance of the capacitor 1020, the resonator 1000 may also be referred to as an MNG resonator. Various criteria may be applied to determine the capacitance of the capacitor 1020. For example, the various criteria may include one or more of the following: a criterion to enable the resonator 1000 to have the characteristic of the metamaterial, a criterion to enable the resonator 1000 to have a negative magnetic permeability in a target frequency, a criterion to enable the resonator 1000 to have a zeroth order resonance characteristic in the target frequency, or the like. Based on at least one criterion among the aforementioned criteria, the capacitance of the capacitor 1020 may be determined.

The resonator 1000, also referred to as the MNG resonator 1000, may have a zeroth order resonance characteristic (i.e., having, as a resonance frequency, a frequency when a propagation constant is "0"). If the resonator 1000 has a zeroth order resonance characteristic, the resonance frequency may be independent with respect to a physical size of the MNG resonator 1000. Thus, by appropriately designing (or configuring) the capacitor 1020, the MNG resonator 1000 may sufficiently change the resonance frequency without substantially changing the physical size of the MNG resonator 1000.

Referring to the MNG resonator 1000 of FIG. 10, in a near field, the electric field may be concentrated on the capacitor 1020 inserted into the transmission line. Accordingly, due to the capacitor 1020, the magnetic field may become dominant in the near field. And, since the MNG resonator 1000 having the zeroth-order resonance characteristic may have characteristics similar to a magnetic dipole, the magnetic field may become dominant in the near field. A relatively small amount of the electric field formed due to the insertion of the capacitor 1020 may be concentrated on the capacitor 1020 and thus, the magnetic field may become further dominant.

Also, the MNG resonator 1000 may include the matcher 1030 to be used in impedance matching. The matcher 1030 may be configured to appropriately adjust the strength of magnetic field of the MNG resonator 1000. The impedance of the MNG resonator 1000 may be determined by the matcher 1030. In one or more embodiments, current may flow in the MNG resonator 1000 via a connector 1040, or may flow out from the MNG resonator 1000 via the connector 1040. And the connector 1040 may be connected to the ground conducting portion 1013 or the matcher 1030.

As illustrated in FIG. 10, the matcher 1030 may be positioned within the loop formed by the loop structure of the resonator 1000. The matcher 1030 may be configured to adjust the impedance of the resonator 1000 by changing the physical shape of the matcher 1030. For example, the matcher 1030 may include the conductor 1031 to be used in the impedance matching in a location separate from the ground conducting portion 1013 by a distance h. The impedance of the resonator 1000 may be changed by adjusting the distance h.

In some implementations, a controller may be provided to control the matcher 1030. In this case, the matcher 1030 may change the physical shape of the matcher 1030 based on a control signal generated by the controller. For example, the distance h between the conductor 1031 of the matcher 1030 and the ground conducting portion 1013 may be increased or decreased based on the control signal. Accordingly, the physical shape of the matcher 1030 may be changed such that the impedance of the resonator 1000 may be adjusted. The distance h between the conductor 1031 of the matcher 1030 and the ground conducting portion 1013 may be adjusted using a variety of schemes. As one example, a plurality of conductors may be included in the matcher 1030 and the distance h may be adjusted by adaptively activating one of the conductors. Alternatively or additionally, the distance h may be adjusted by adjusting the physical location of the conductor 1031 up and down. For instance, the distance h may be controlled based on the control signal of the controller. The controller may generate the control signal using various factors. As illustrated in FIG. 10, the matcher 1030 may be configured as a passive element such as the conductor 1031, for instance. Of course, in other embodiments, the matcher 1030 may be configured as an active element such as a diode, a transistor, or the like. When the active element is included in the matcher 1030, the active element may be driven based on the control signal generated by the controller, and the impedance of the resonator 1000 may be adjusted based on the control signal. For example, if the active element is a diode included in the matcher 1030, the impedance of the resonator 1000 may be adjusted depending on whether the diode is in an ON state or in an OFF state.

In some implementations, a magnetic core may be further provided to pass through the MNG resonator 1000. The magnetic core may perform a function of increasing a power transmission distance.

FIG. 11 illustrates a resonator 1100 for a wireless power transmission configured as a bulky type.

As used herein, the term "bulky type" may refer to a seamless connection connecting at least two parts in an integrated form. Referring to FIG. 11, a first signal conducting portion 1111 and a conductor 1142 1112 may be integrally formed, rather than being separately manufactured and being connected to each other. Similarly, a second signal conducting portion 1112 and a conductor 1141 may also be integrally manufactured.

When the second signal conducting portion 1112 and the conductor 1141 are separately manufactured and then are connected to each other, a loss of conduction may occur due to a seam 1150. Thus, in some implementations, the second signal conducting portion 1112 and the conductor 1141 may be connected to each other without using a separate seam (i.e., seamlessly connected to each other). Accordingly, it is possible to decrease a conductor loss caused by the seam 1150. For instance, the second signal conducting portion 1112 and a ground conducting portion 1113 may be seamlessly and integrally manufactured. Similarly, the first signal conducting portion 1111, the conductor 1142 and the ground conducting portion 1113 may be seamlessly and integrally manufactured.

Figure 12:
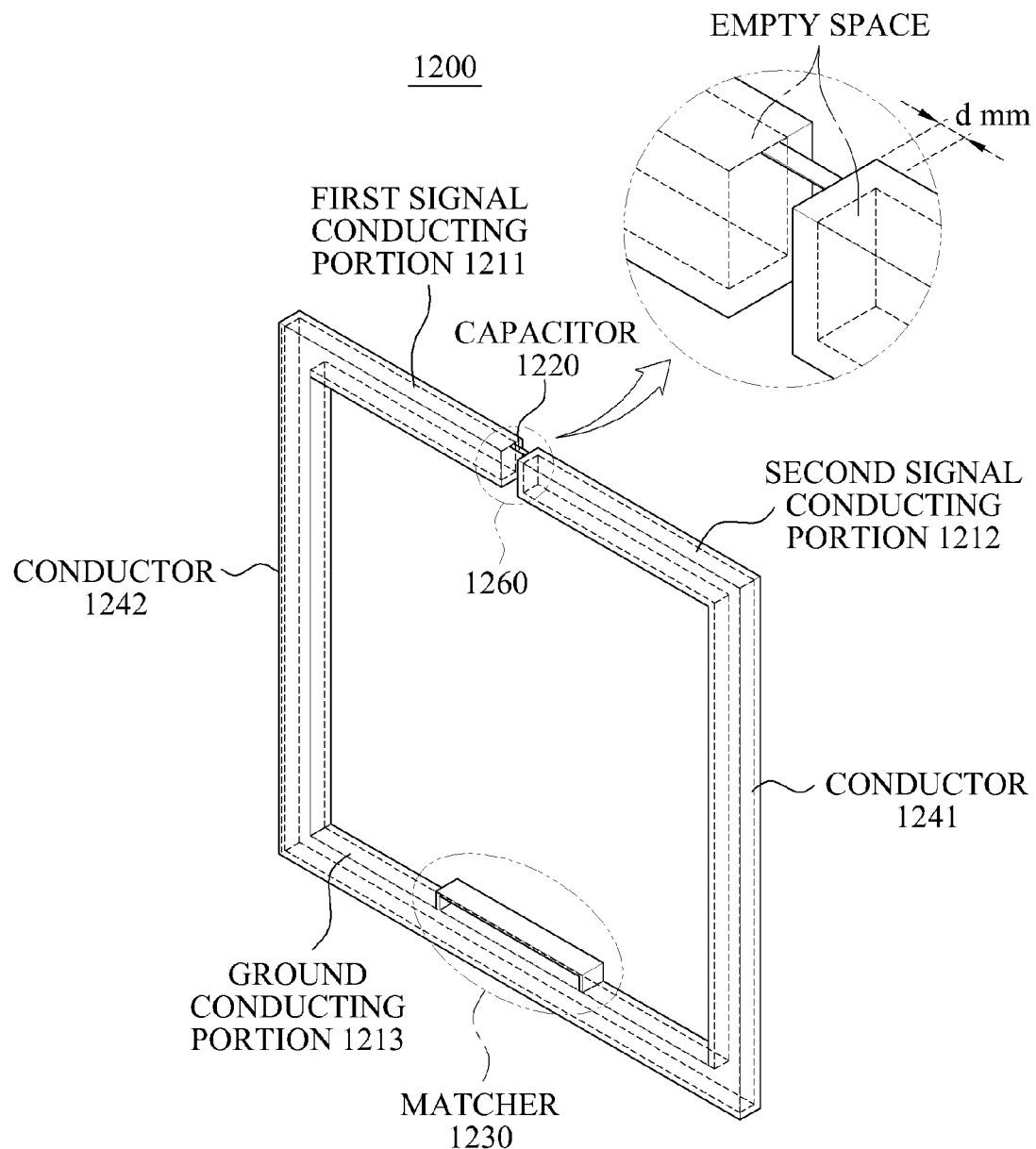
FIG. 12 illustrates a resonator for a wireless power transmission, configured as a hollow type.

A matcher 1130 may be provided that is similarly constructed as described herein in one or more embodiments. FIG. 12 illustrates a resonator 1200 for a wireless power transmission, configured as a hollow type.

Referring to FIG. 12, each of a first signal conducting portion 1211, a second signal conducting portion 1212, a ground conducting portion 1213, and conductors 1241 and 1242 of the resonator 1200 configured as the hollow type structure. As used herein the term "hollow type" refers to a configuration that may include an empty space inside.

For a given resonance frequency, an active current may be modeled to flow in only a portion of the first signal conducting portion 1211 instead of all of the first signal conducting portion 1211, a portion of the second signal conducting portion 1212 instead of all of the second signal conducting portion 1212, a portion of the ground conducting portion 1213 instead of all of the ground conducting portion 1213, and portions of the conductors 1241 and 1242 instead of all of the conductors 1241 and 1242. When a depth of each of the first signal conducting portion 1211, the second signal conducting portion 1212, the ground conducting portion 1213, and the conductors 1241 and 1242 is significantly deeper than a corresponding skin depth in the given resonance frequency, such a structure may be ineffective. The significantly deeper depth may, however, increase the weight or the manufacturing costs of the resonator 1200 in some instances.

Accordingly, for the given resonance frequency, the depth of each of the first signal conducting portion 1211, the second signal conducting portion 1212, the ground conducting portion 1213, and the conductors 1241 and 1242 may be appropriately determined based on the corresponding skin depth of each of the first signal conducting portion 1211, the second signal conducting portion 1212, the ground conducting portion 1213, and the conductors 1241 and 1242. In an embodiment in which each of the first signal conducting portion 1211, the second signal conducting portion 1212, the ground conducting portion 1213, and the conductors 1241 and 1242 has an appropriate depth deeper than a corresponding skin depth, the resonator 1200 may be manufactured to be lighter, and the manufacturing costs of the resonator 1200 may also decrease.

For example, as illustrated in FIG. 12, the depth of the second signal conducting portion 1212 (as further illustrated in the enlarged view region 1260 indicated by a circle) may be determined as "d" mm and d may be determined according to $$d = \frac{1}{\sqrt{\pi f \mu \sigma}}.$$

Here, f denotes a frequency, μ denotes a magnetic permeability, and σ denotes a conductor constant. In one implementation, when the first signal conducting portion 1211, the second signal conducting portion 1212, the ground conducting portion 1213, and the conductors 1241 and 1242 are made of a copper and they may have a conductivity of $5.8 \times 10^7$ siemens per meter (S·m$^{-1}$), the skin depth may be about 0.6 mm with respect to 10 kHz of the resonance frequency, and the skin depth may be about 0.006 mm with respect to 100 MHz of the resonance frequency.

Figure 13:
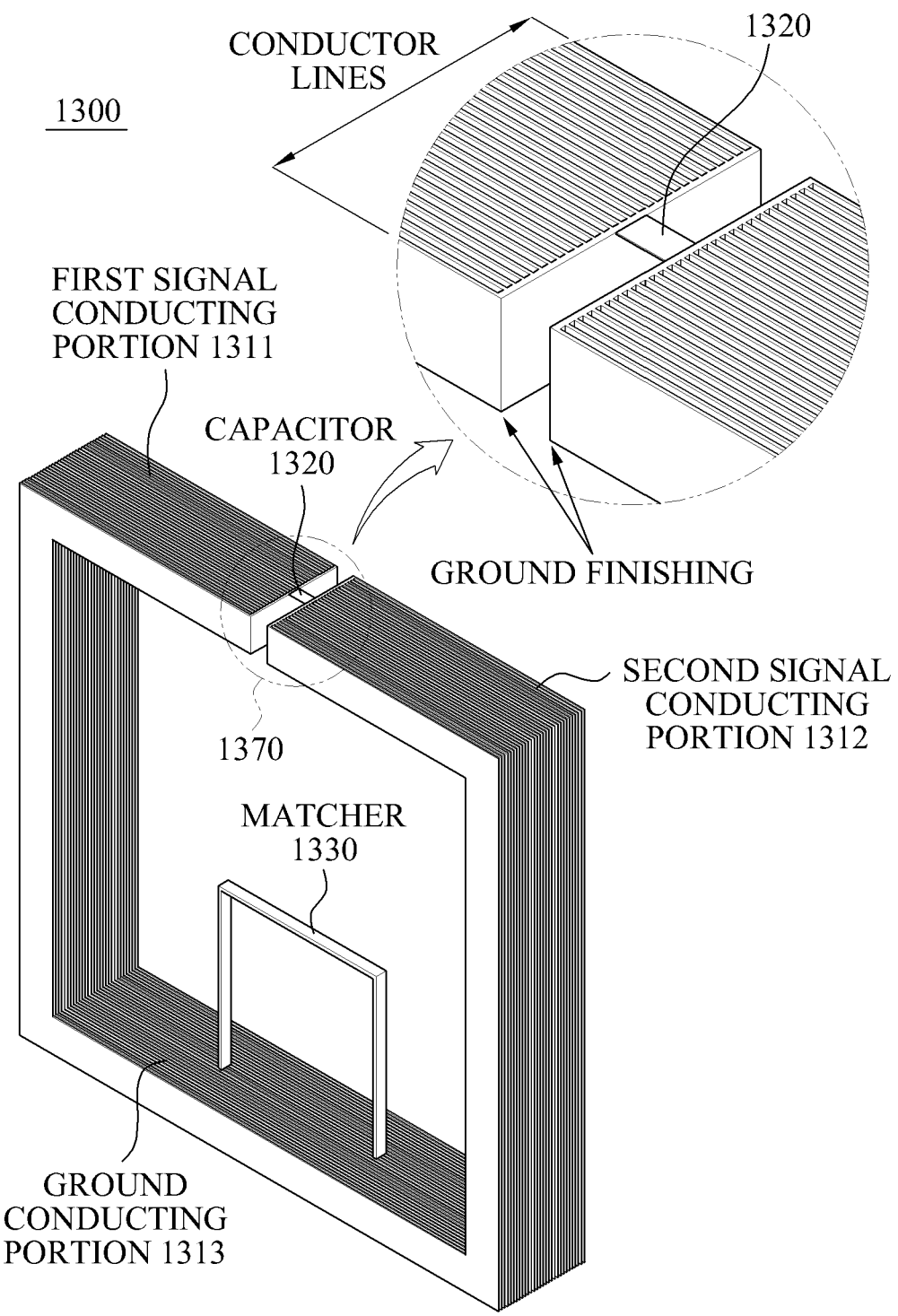
FIG. 13 illustrates a resonator for a wireless power transmission using a parallel-sheet configuration.

A capacitor 1220 and a matcher 1230 may be provided that are similarly constructed as described herein in one or more embodiments. FIG. 13 illustrates a resonator 1300 for a wireless power transmission using a parallel-sheet configuration.

Referring to FIG. 13, the parallel-sheet configuration may be applicable to each of a first signal conducting portion 1311 and a second signal conducting portion 1312 included in the resonator 1300.

The first signal conducting portion 1311 and the second signal conducting portion 1312 may not be perfect conductors, and thus may have an inherent resistance. Due to this resistance, an ohmic loss may occur. The ohmic loss may decrease a Q-factor and may also decrease a coupling effect.

By applying the parallel-sheet configuration to each of the first signal conducting portion 1311 and the second signal conducting portion 1312, it may be possible to decrease the ohmic loss, and to increase the Q-factor and the coupling effect. Referring to the enlarged view portion 1370 indicated by a circle in FIG. 13, in an example in which the parallel-sheet configuration is applied, each of the first signal conducting portion 1311 and the second signal conducting portion 1312 may include a plurality of conductor lines. The plurality of conductor lines may be disposed in parallel, and may be electrically connected (i.e., shorted) at an end portion of each of the first signal conducting portion 1311 and the second signal conducting portion 1312.

When the parallel-sheet configuration is applied to each of the first signal conducting portion 1311 and the second signal conducting portion 1312, the plurality of conductor lines may be disposed in parallel. Accordingly, a sum of resistances having the conductor lines may decrease. Consequently, the resistance loss may decrease, and the Q-factor and the coupling effect may increase.

A capacitor 1320 and a matcher 1330 positioned on the ground conducting portion 1313 may be provided that are similarly constructed as described herein in one or more embodiments.

Figure 14:
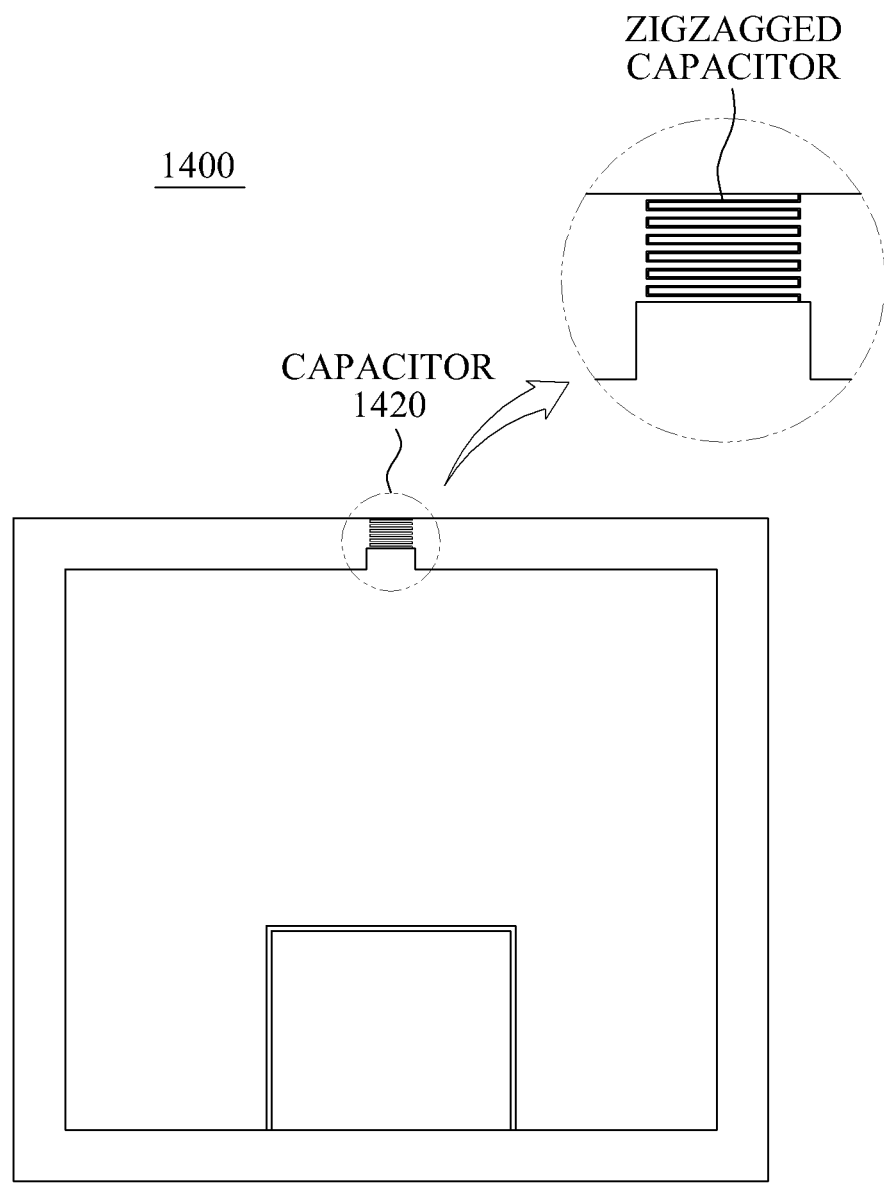
FIG. 14 illustrates a resonator for a wireless power transmission including a distributed capacitor.

FIG. 14 illustrates a resonator 1400 for a wireless power transmission including a distributed capacitor.

Referring to FIG. 14, a capacitor 1420 included in the resonator 1400 is configured for the wireless power transmission. A capacitor as a lumped element may have a relatively high equivalent series resistance (ESR). A variety of schemes have been proposed to decrease the ESR contained in the capacitor of the lumped element. According to an embodiment, by using the capacitor 1120 as a distributed element, it may be possible to decrease the ESR. As will be appreciated, a loss caused by the ESR may decrease a Q-factor and a coupling effect.

As illustrated in FIG. 14, the capacitor 1420 may be configured as a conductive line having the zigzagged structure.

By employing the capacitor 1420 as the distributed element, it may be possible to decrease the loss occurring due to the ESR in some instances. In addition, by disposing a plurality of capacitors as lumped elements, it may be possible to decrease the loss occurring due to the ESR. Since a resistance of each of the capacitors as the lumped elements decreases through a parallel connection, active resistances of parallel-connected capacitors as the lumped elements may also decrease, whereby the loss occurring due to the ESR may decrease. For example, by employing ten capacitors of 1 pF each instead of using a single capacitor of 10 pF, it may be possible to decrease the loss occurring due to the ESR in some instances.

Figure 15A:
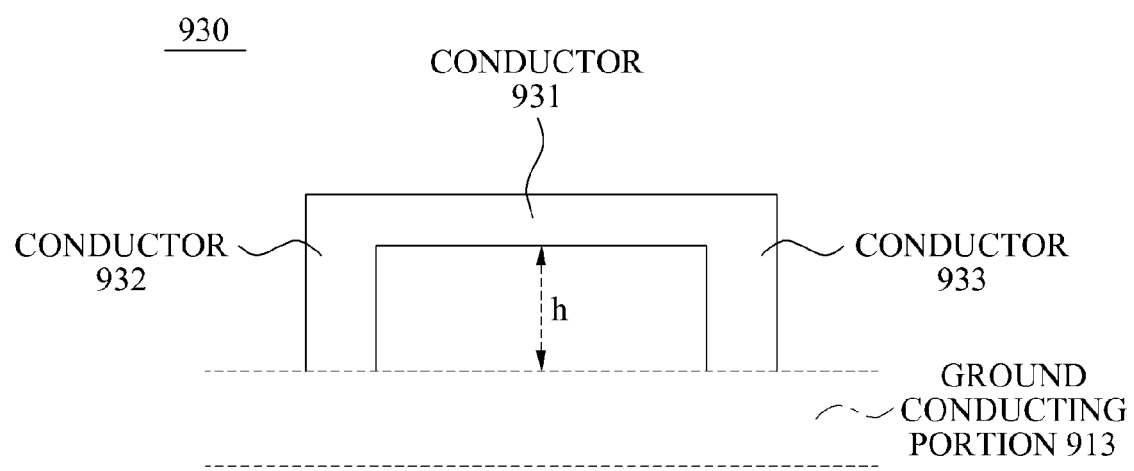
FIG. 15A illustrates a matcher used in the resonator of FIG. 9.
Figure 15B:
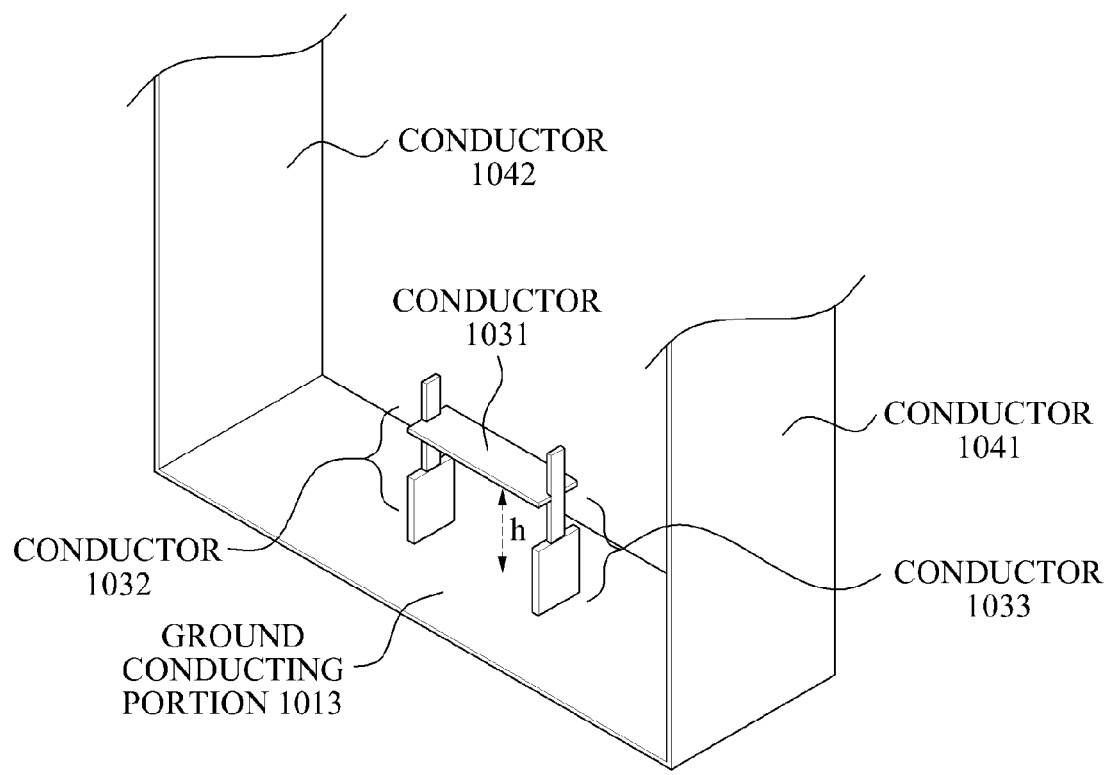
FIG. 15B illustrates an example of a matcher used in the resonator of FIG. 10.

FIG. 15A illustrates one embodiment of the matcher 930 used in the resonator 900 illustrated in FIG. 9, and FIG. 15B illustrates an example of the matcher 1030 used in the resonator 1000 illustrated in FIG. 10.

FIG. 15A illustrates a portion of the resonator 900 of FIG. 9 including the matcher 930, and FIG. 15B illustrates a portion of the resonator 1000 of FIG. 10 including the matcher 1030.

Referring to FIG. 15A, the matcher 930 may include the conductor 931, a conductor 932, and a conductor 933. The conductors 932 and 933 may be connected to the ground conducting portion 913 and the conductor 931. The impedance of the 2D resonator may be determined based on a distance h between the conductor 931 and the ground conducting portion 913. The distance h between the conductor 931 and the ground conducting portion 913 may be controlled by the controller. The distance h between the conductor 931 and the ground conducting portion 913 may be adjusted using a variety of schemes. For example, the variety of schemes may include one or more of the following: a scheme of adjusting the distance h by adaptively activating one of the conductors 931, 932, and 933, a scheme of adjusting the physical location of the conductor 931 up and down, or the like.

Referring to FIG. 15B, the matcher 1030 may include the conductor 1031, a conductor 1032, a conductor 1033 and conductors 1041 and 1042. The conductors 1032 and 1033 may be connected to the ground conducting portion 1013 and the conductor 1031. The impedance of the 3D resonator may be determined based on a distance h between the conductor 1031 and the ground conducting portion 1013. The distance h between the conductor 1031 and the ground conducting portion 1013 may be controlled by the controller, for example Similar to the matcher 930 illustrated in FIG. 15A, in the matcher 1030, the distance h between the conductor 1031 and the ground conducting portion 1013 may be adjusted using a variety of schemes. For example, the variety of schemes may include one or more of the following: a scheme of adjusting the distance h by adaptively activating one of the conductors 1031, 1032, and 1033, a scheme of adjusting the physical location of the conductor 1031 up and down, or the like.

In some implementations, the matcher may include an active element. Thus, a scheme of adjusting an impedance of a resonator using the active element may be similar to the examples described above. For example, the impedance of the resonator may be adjusted by changing a path of a current flowing through the matcher using the active element.

Figure 16:
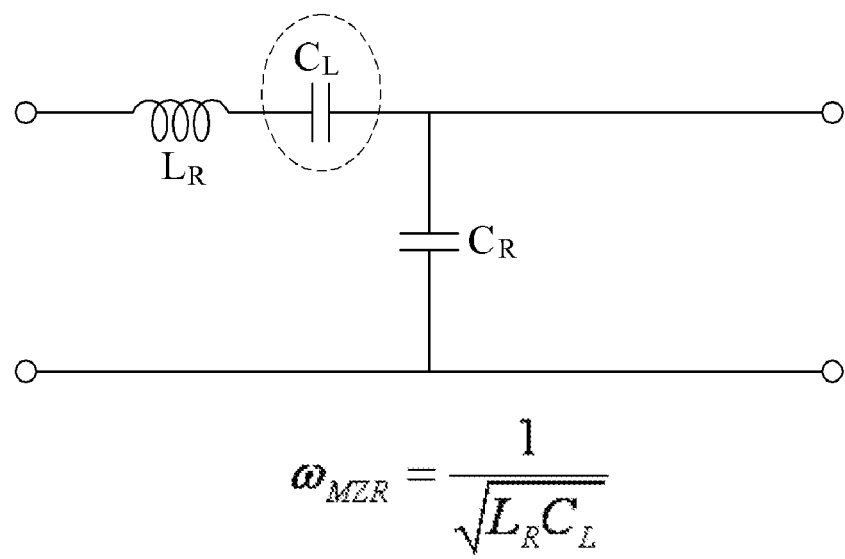
FIG. 16 is a diagram illustrating one equivalent circuit of the resonator for a wireless power transmission of FIG. 9.

FIG. 16 illustrates one equivalent circuit of the resonator 900 of FIG. 9.

The resonator 900 of FIG. 9 for wireless power transmission may be modeled to the equivalent circuit of FIG. 16. In the equivalent circuit depicted in FIG. 16, $L_R$ denotes an inductance of the power transmission line, $C_L$ denotes the capacitor 920 that is inserted in a form of a lumped element in the middle of the power transmission line, and $C_R$ denotes a capacitance between the power transmissions and/or ground of FIG. 9.

In some instances, the resonator 900 may have a zeroth resonance characteristic. For example, when a propagation constant is "0", the resonator 900 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}}.$$ [Equation 2]

In Equation 2, MZR denotes a Mu zero resonator.

Referring to Equation 2, the resonance frequency $\omega_{MZR}$ the resonator 900 may be determined by $L_R/C_L$. A physical size of the resonator 900 and the resonance frequency $\omega_{MZR}$ may be independent with respect to each other. Since the physical sizes are independent with respect to each other, the physical size of the resonator 900 may be sufficiently reduced.

The units described herein may be implemented using hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resonance power transmitter comprising:
   a source resonator configured to transfer a resonance power to one or more resonance power receivers; and
   a source controller configured to:
      determine a number of the one or more resonance power receivers that are within a distance to receive the resonance power,
      measure a reflected power corresponding to the resonance power, and
      control voltage supplied to a power converter based on the measured reflected power and the number of the one or more resonance power receivers;
   wherein the source controller is further configured to discretely increase the voltage to three or more levels, in response to an increase in the number of the one or more resonance power receivers.

2. The resonance power transmitter of claim 1, wherein the source controller is further configured to control the voltage based on a distance between the source resonator and the one or more resonance power receivers.

3. The resonance power transmitter of claim 1, wherein the source controller is further configured to control the voltage based on a charge state of a load connected to the one or more resonance power receivers.

4. The resonance power transmitter of claim 1, wherein the source controller is further configured to reduce the voltage in response to an amount of the reflected power being increased, and the source controller is further configured to increase the voltage in response to the amount of the reflected power being reduced.

5. The resonance power transmitter of claim 1, further comprising:
a communication unit configured to receive an identifier (ID) of each of the one or more resonance power receivers,
wherein the source controller is further configured to determine the number of the one or more resonance power receivers, based on the IDs received.

6. The resonance power transmitter of claim 1, wherein the source controller is further configured to change the voltage, in response to the number of the one or more resonance power receivers remaining unchanged and an amount of the reflected power being changed.

7. The resonance power transmitter of claim 1, wherein the reflected power corresponds to the resonance power transmitted to the resonance power receivers.

8. The resonance power transmitter of claim 1, wherein the three or more levels comprise a voltage level at a start of wireless power transmission, a voltage level at an end of wireless power transmission, and at least one voltage level different than the start voltage level and the end voltage level.

9. A method of controlling power conversion in a resonance power transmitter, the method comprising:
determining a number of resonance power receivers;
measuring a reflected power corresponding to a resonance power; and
controlling voltage supplied to a power converter based on the measured reflected power and the number of the resonance power receivers, wherein:
the voltage is discretely increased to three or more levels, in response to an increase in the number of the resonance power receivers, and
the determining comprises determining the number of resonance power receivers that are within a distance to receive the resonance power.

10. The method of claim 9, wherein the controlling comprises reducing the voltage in response to an amount of the reflected power being increased, and increasing the voltage in response to the amount of the reflected power being reduced.

11. The method of claim 9, wherein the voltage supplied to the power converter is direct current (DC) voltage.

12. The method of claim 9, wherein the determining of the number of resonance power receivers comprises receiving an identifier (ID) from the resonance power receivers.

13. The method of claim 9, wherein the resonance power is transmitted to the resonance power receivers.

14. A method of controlling power conversion in a resonance power transmitter, the method comprising:
determining a number of resonance power receivers;
measuring a reflected power corresponding to a resonance power; and
controlling voltage supplied to a power converter based on the measured reflected power and the number of the resonance power receivers, wherein:
the controlling comprises discretely increasing the voltage to three or more levels in response to an increase in the number of the resonance power receivers, and
the controlling comprises linearly controlling the voltage, in response to the number of the resonance power receivers remaining unchanged, and an amount of the reflected power being changed.

* * * * *